Dec. 31, 1935.　　　　O. WÜNSCHE　　　2,026,410
CONTROL SYSTEM
Filed April 23, 1934
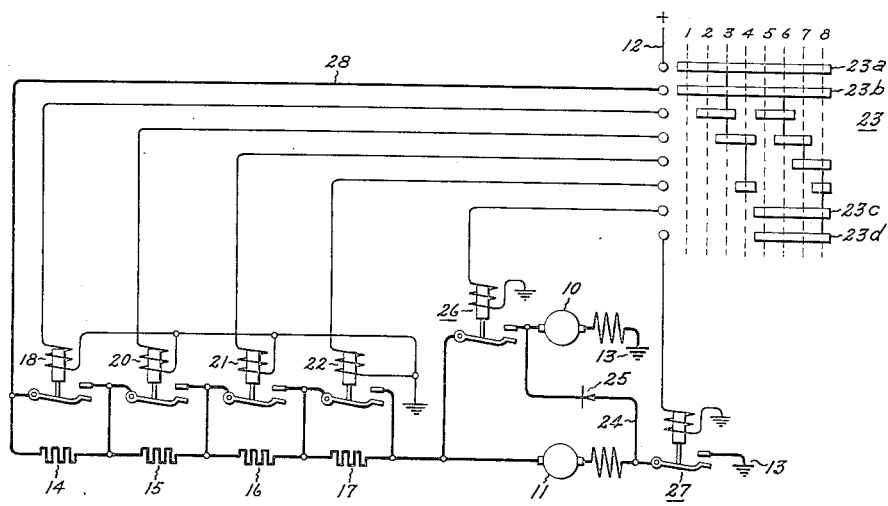
Inventor:
Otto Wünsche,
by Harry E. Dunham
His Attorney Patented Dec. 31, 1935

2,026,410

UNITED STATES PATENT OFFICE 2,026,410

CONTROL SYSTEM

Otto Wünsche, Berlin, Germany, assignor to General Electric Company, a corporation of New York Application April 23, 1934, Serial No. 722,003
In Germany May 3, 1933

6 Claims. (Cl. 172—179)

This invention relates to control systems for effecting series and parallel connections of a plurality of electrical devices, and it has for an object the provision of a simple, reliable and improved system of this character.

More specifically, this invention relates to systems including switching controllers for effecting the transition from series to parallel of a plurality of electrical devices such for example as electric motors, and a more specific object is the provision of means for effecting a series parallel transition directly, without interrupting the energization of either device and thus eliminating intermediate switching positions of the controller.

In the past, the transition from series to parallel connection of motors, for example, has been accomplished by first partially completing a parallel path for one of the motors, which resulted in short-circuiting the other motor, and subsequently opening the series connection between the motors and thus removing the short-circuit, and finally completing the parallel connection of both motors to the source. This requires two intermediate switching positions on the controller and entails the further disadvantage that during the transition the driving torque of half the motors is lost.

In carrying the invention into effect in one form thereof, an electric valve is interposed in series connection between the two devices, e. g., motors, and the control is arranged for effecting the transition directly from series to parallel. In illustrating the invention in one form thereof, it is shown as applied to a pair of electric motors of the type utilized for driving electrically operated vehicles such as street cars and locomotives.

For a better and more complete understanding of the invention reference should now be had to the following specification and to the accompanying drawing, the single figure of which is a simple diagrammatical illustration of an embodiment of the invention.

Referring now to the drawing, a pair of direct current series motors 10 and 11 are supplied from a suitable source, conventionally illustrated by the positive line 12 and the ground connections 13. A plurality of sections of resistance 14, 15, 16, and 17 are arranged in the armature circuit of these motors. A corresponding number of switching devices, e. g. contactors 18, 20, 21, and 22 respectively control the short circuiting and the inclusion of resistance sections 14, 15, 16, and 17 in the motor circuit. These contactors are in turn under the control of a suitable switching device conventionally illustrated as a multi-position controller 23.

An electrical connection 24 provides a series connection between the ground terminal of the motor 11 and the line terminal of the motor 10. A one-way conducting device or electric valve 25 is included in this series connection 24. This valve may be an asymmetrical conducting device of any suitable type, such for example as a vacuum tube or a surface contact type rectifying device, e. g., the well-known copper-oxide rectifying device. A pair of switching devices illustrated as contactors 26, 27 are provided for establishing the parallel connections of the motors 10 and 11.

With the above understanding of the elements and their organization in the completed system, the operation of the system itself will readily be understood from the following detailed description: Assuming the controller 23 in the off position in which it is illustrated, the motors 10, 11 are deenergized and at rest, the contactors 18, 20, 21 and 22 are in their open positions and the full amount of the resistance 14, 15, 16, and 17 is included in the armature circuit of the motors. The contactors 26 and 27 are opened and the armatures of motors 10 and 11 are connected in series relationship through the connection 24. Operation of the controller to its first position completes the connection of the motors 10, 11 to the source 12, 13 over the following circuit: positive side of source 12, controller segments 23a and 23b, conductor 28, resistance sections 14, 15, 16, and 17, motor 11, conductor 24, valve 25, motor 10 and ground connection 13. As a result of the energization of the motors 10 and 11 with their armatures in series relationship with each other through the full amount of the starting resistance, the motors begin to rotate at slow speed. Further operation of the controller through the second, third and fourth positions completes energization for the operating coils of contactors 18, 20, and 22 causing them to close and short circuit resistance sections 14, 15, and 17 in the order named. In the fourth position, contactor 18 is deenergized and its contacts open to interrupt the short-circuit about resistance section 14 so that only resistance sections 15 and 17 remain short circuited. Since resistance sections 14 and 16 are of low ohmic value, the motors 10 and 11 operate at high speed for the series connection.

Operation of the controller to its fifth position deenergizes the contactors 20, 21 and 22 causing them to open and reinsert resistance sections 15, 16 and 17 in the motor circuit. Simultaneously, segments 23c and 23d of the controller complete energizing circuits for the operating coils of the parallelling contactors 26, 27, causing them to close and connect the armatures of the motors 10 and 11 to the source 12, 13 in parallel relationship with each other and in series with the resistance sections 15, 16 and 17. It is to be noted that the closing of the contactor 27 does not establish a short circuit about the armature of the motor 10, that is to say, it does not complete a circuit through which current can flow in the reverse direction through the connection 24 because the valve 25 suppresses flow of current from the line terminal of the armature of motor 10 to the ground terminal of motor 11. As a result, current flow is maintained in series connection 24 until the parallelling contactors 26, 27 close to effect the transition from series to parallel. As soon as the transition is effected current flows through both armatures in parallel and thus there is no instant in the operation when either motor 10 or 11 is short circuited or deenergized. Thus the transition from series to parallel is made directly by switching from one position to the next on the controller 23 and no intermediate switching positions are required for first completing a short circuit about one of the motors and subsequently opening the short circuit. As the controller 23 is operated through the successive positions from the fifth to the eighth, the contactors 19, 20, 21, and 22 are successively closed to short-circuit resistance sections 14, 15, 16, and 17, respectively. In the seventh and eighth positions, the contactors 18 and 20 are respectively deenergized and opened to interrupt the short-circuit about resistance sections 14 and 15, respectively, and the motors operate at corresponding speeds.

Although in accordance with the provisions of the patent statutes the invention is described as embodied in concrete form, it will be understood that the apparatus and connections shown are merely illustrative and that the invention is not limited thereto since alterations and modifications will readily suggest themselves to persons skilled in the art without departing from the true spirit of this invention or the scope of the annexed claims.

What I claim as new and desire to secure by Letters Patent of the United States, is:

1. In combination with a pair of electric devices, a controller for effecting series parallel connection of said devices and a connection between said devices including an asymmetrical conducting means for conducting current in one direction when said devices are connected in series and for substantially obstructing current flow in the opposite direction when said devices are connected in parallel thereby to avoid interruption of the energization of said devices during the transition from series to parallel.

2. In combination with a pair of electric devices, a controller for effecting series parallel connection of said devices, and rectifying means included in the connections between said devices for eliminating intermediate switching positions on said controller and thereby provide direct transition from series to parallel.

3. In combination with a pair of electric motors, a controller for effecting series parallel connections of said motors, and a rectifying device included in the connections between said motors for conducting current in one direction and for substantially suppressing current flow in the opposite direction thereby to avoid interruption of the circuit and short circuiting of said motors during the transition from series to parallel.

4. A motor control system comprising in combination a pair of electric motors, a connection between said motors to provide for series connection, control means for effecting series parallel connection of said motors and an asymmetrical conducting device included in said connection arranged to conduct current when said motors are connected in series and to obstruct current flow when said motors are connected in parallel.

5. A motor control system comprising a pair of electric motors, a connection between said motors providing series connection thereof, a pair of switching devices for completing parallel connections of said motors and a rectifying device included in said connection between said motors and connected to each of said switching devices for conducting current in one direction when said motors are connected in series relationship and for substantially suppressing current flow in the opposite direction when said motors are connected in parallel.

6. A motor control system comprising a pair of electric motors, a resistance connected in circuit with said motors, a connection between said motors providing series connection thereof, a pair of switching members for effecting parallel connection of said motors, a controller having series and parallel switching positions for controlling said resistance and for controlling said switching members to effect the transition from series to parallel, and an asymmetrical conducting device included in said connection between said motors and connected to each of said members to provide direct transition from series to parallel and thereby eliminate intermediate switching positions on said controller.

OTTO WÜNSCHE.